Dec. 22, 1942.   A. G. STEINMAYER ET AL   2,305,999
METHOD AND MACHINE FOR WINDING COILS
Filed June 26, 1940       5 Sheets-Sheet 1

INVENTORS
ALWIN G. STEINMAYER
WILLIAM E. KRUEGER
BY Anton R. Woodcock
ATTORNEY.

INVENTORS
ALWIN G. STEINMAYER
WILLIAM E. KRUEGER
ATTORNEY.

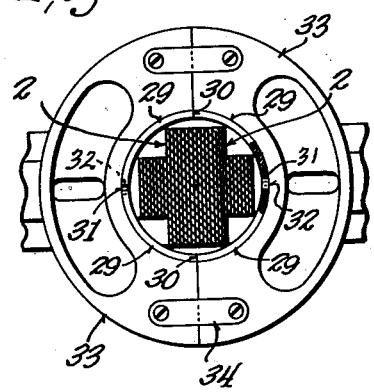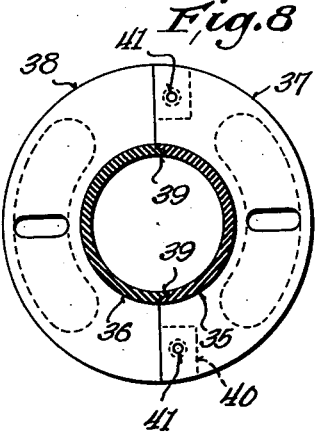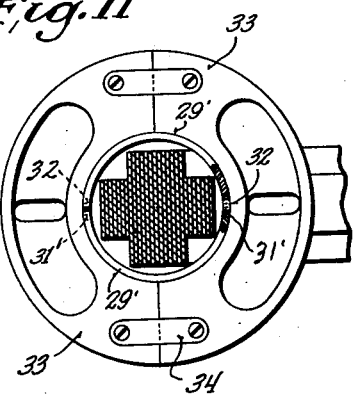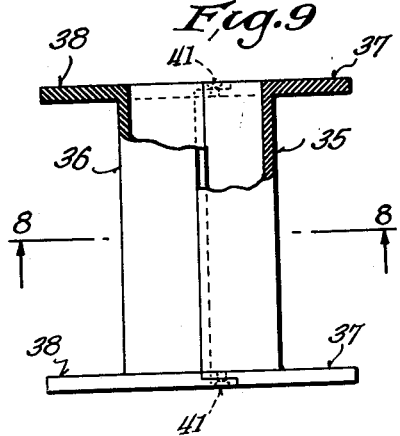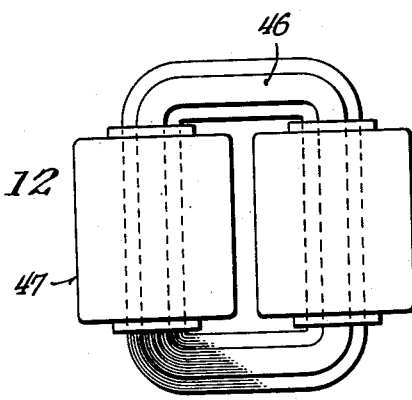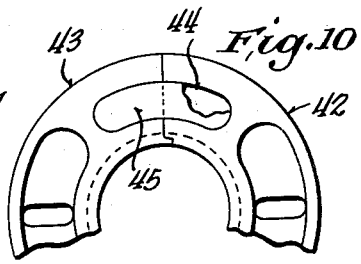

Dec. 22, 1942.  A. G. STEINMAYER ET AL  2,305,999
METHOD AND MACHINE FOR WINDING COILS
Filed June 26, 1940    5 Sheets-Sheet 5
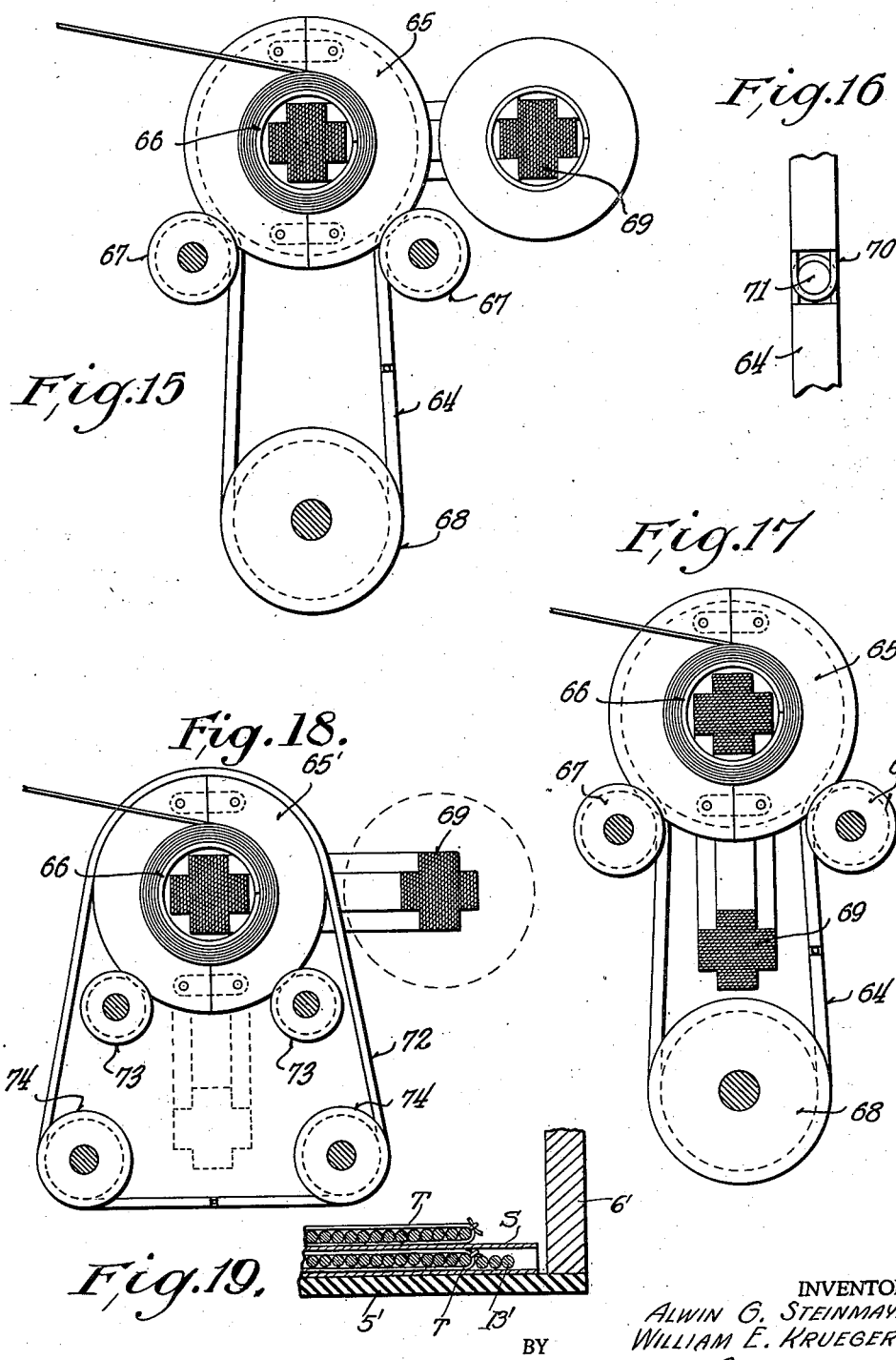
INVENTORS
ALWIN G. STEINMAYER
WILLIAM E. KRUEGER
BY
ATTORNEY.

Patented Dec. 22, 1942

2,305,999

UNITED STATES PATENT OFFICE 2,305,999

METHOD AND MACHINE FOR WINDING COILS

Alwin G. Steinmayer, Milwaukee, and William E. Krueger, South Milwaukee, Wis., assignors to Line Material Company, Milwaukee, Wis., a corporation of Delaware Application June 26, 1940, Serial No. 342,524

15 Claims. (Cl. 242—4)

This invention relates to a method and machine for winding a coil in place on a magnetic core.

This invention has for its object a method and machine for winding coils on closed magnetic cores or on any type of magnetic core where the finished coil cannot be slipped over the core. The invention in its broadest aspects contemplates the winding of the coil by the relative rotation of the coil and core, and in the form shown one way of doing this has been illustrated in that means have been shown for holding the core stationary and rotating the coil while the coil is being wound. The invention is particularly applicable to winding coils on closed cores for transformers or the like, which are constructed in accordance with the disclosure of our copending application Serial No. 339,256, filed June 7, 1940, for. Method and means for making cores for transformers or the like, in which the cores are wound from elongated magnetic material to form closed cores.

Further objects are to provide a method of winding a coil in place on a core in which a shell is provided and is rotated and the coil wound on the shell while the shell is being rotated, the shell being either left in place with or without end flanges or in which the shell may be formed of a plurality of sections and removed, together with the end flanges, or in which the shell may be formed of a single piece which is split and which is preferably sufficiently resilient to be sprung over the core and thereafter left in place, the end flanges being either removed or left in place.

More specifically, objects of this invention are to provide a method of winding a coil on a magnetic core in which a shell is provided and is preferably supported out of contact with the core, the shell being carried by end flanges which are driven to thereby rotate the shell while the coil is being wound.

In transformers or the like, when a severe load occurs, such as a short circuit, extremely large mechanical forces are produced in the coil structure tending to deform or distort the coil. A further object is to provide a method of winding a circular coil on a rectangular core as the circular coil resists the distorting forces much better than a rectangular formed coil, the core itself being so formed as to provide at least one straight leg portion on which the circular coil is wound thereby having very little waste space between the coil and the core.

A further object is to provide a method of winding a coil or coils through the window in a formed closed core so that the coil or coils substantially fill the window.

Further objects are to provide a machine for winding a coil on a closed magnetic core or a core of any type where the finished coil cannot be slipped over the core, by causing relative rotation to occur between the coil and the core, as for example by rotating the shell while the core is held stationary, the invention in its broadest aspects, however, contemplating the use of a machine for rotating either the coil or the core while the other member is held relatively stationary.

Further objects are to provide a machine for winding a coil on a magnetic core by causing relative rotation of a shell with reference to the core, the shell being preferably supported by end flanges through which the driving of a shell is obtained if the shell is rotated and the core held relatively stationary, the wire being guided by hand or in any other suitable manner, and the machine providing free access throughout the entire face of the coil so that the coil winder has the entire face of the coil exposed for guiding the wire and for tying successive layers or portions of the coil in place.

Further objects are to provide a method and a machine for winding a coil on a magnetic core in which the coil may be very quickly and expeditiously wound, in which the construction is very simple, and in which the process eliminates many heretofore necessary steps in producing a transformer, choke, or the like on which a finished coil structure is positioned.

It is to be distinctly understood that in all reference to "coil" it is intended that any coil structure shall be included whether the coil structure includes both a primary and a secondary, as in a transformer for instance, or a separate primary or secondary, or other single coil as in a choke.

Embodiments of the invention are shown in the accompanying drawings, in which:

Figure 7 is a view showing a further form of end flange and shell.

Figure 8 is a view partly in section showing a further form of shell and end flange, such view corresponding to a section on the line 8—8 of Figure 9.

Figure 9 is a plan view, partly in section, of the construction shown in Figure 8.

Figure 10 is an outer face view of a further form of end flange and shell construction.

Figure 11 is an end view, partly in section, of a further form of shell and end flange construction.

Figure 12 is a view corresponding to Figure 1 showing a further form of transformer.

Figure 15 is a diagrammatic view of a further form that the machine may take.

Figure 16 is a detail of a fragment of the belt shown in Figure 15.

Figure 17 is similar to Figure 15, except that it shows a different position in which the core may be held during the winding of the coil thereon.

Figure 18 is a diagrammatic view similar to Figure 15 showing a further form that the machine may take.

Figure 19 is a fragmentary sectional view showing another manner in which the end turns of the winding may be arranged.

Figure 1:
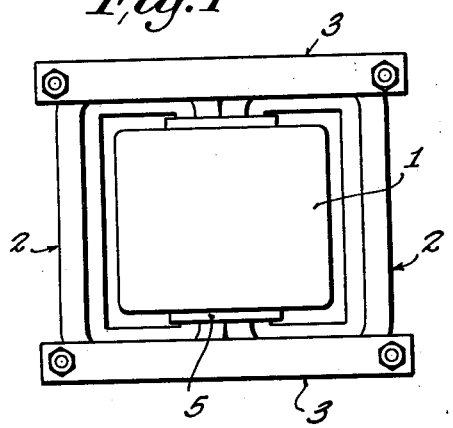
Figure 1 is a view of a transformer constructed in accordance with this invention, with the terminal blocks, casing, etc., omitted.

Referring to the drawings, particularly Figure 1, it will be seen that the invention is applicable to a transformer of the type in which a central core is provided and in which the core extends outwardly around opposite sides of the coil structure. The coil structure in its completed form is indicated by the reference character 1 and the core sections are indicated generally by the reference character 2.

Figure 2:
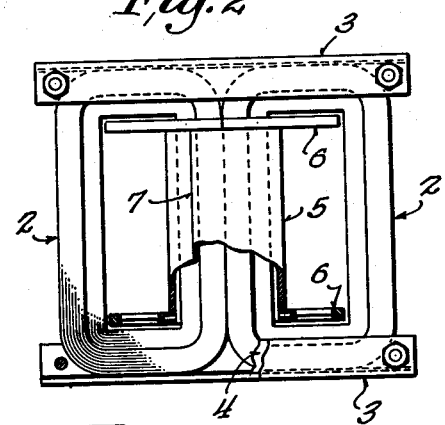
Figure 2 is a view corresponding to Figure 1 showing the shell and end flanges in place on the transformer prior to the winding of the coil structure, such view being partly in section and partly broken away.

The core sections may, as shown in Figure 2, abut centrally of the transformer structure at the place where they pass through the coil and may thus form a central core for the coil of twice the cross-sectional area of the two outer cores. The transformer may be completed by providing supporting brackets 3 in accordance with the usual practice, suitable insulation 4 being preferably positioned between the supporting brackets and the cores. Upon reference to Figure 2, it will be seen that the coil structure is wound on a central shell 5 provided with removable end flanges 6.

In practicing this invention a shell is placed around a portion of the closed magnetic core, whether the core is in the form shown in Figures 1 and 2 or in the form shown in Figure 12. This shell may be formed in many different ways, a few of which have been illustrated in the drawings. In the form shown in Figures 2, 3 and 4, the shell 5 is formed of an insulating sleeve which is split as indicated at 7. This sleeve may be of a phenolic condensation product or other suitable insulating material and is split longitudinally. It is sprung over a straight leg of the core as illustrated and is provided with removable end flanges 6.

These end flanges are themselves split as indicated at 8 and are removably joined in any suitable manner as by means of the clips 9 through which screws pass to secure the clips to the end flanges. Preferably the end flanges are provided with elongated recesses 10, see Figure 4, in which the clips 9 are seated. It is also preferable to provide the end flanges with recessed portions 11 and with apertures 12 so that the inner end 13 of the coil of wire may be secured in any suitable manner as by means of the clip 14, see Figure 4. The partially wound coil is indicated at 1' in Figure 3.

Figure 3:
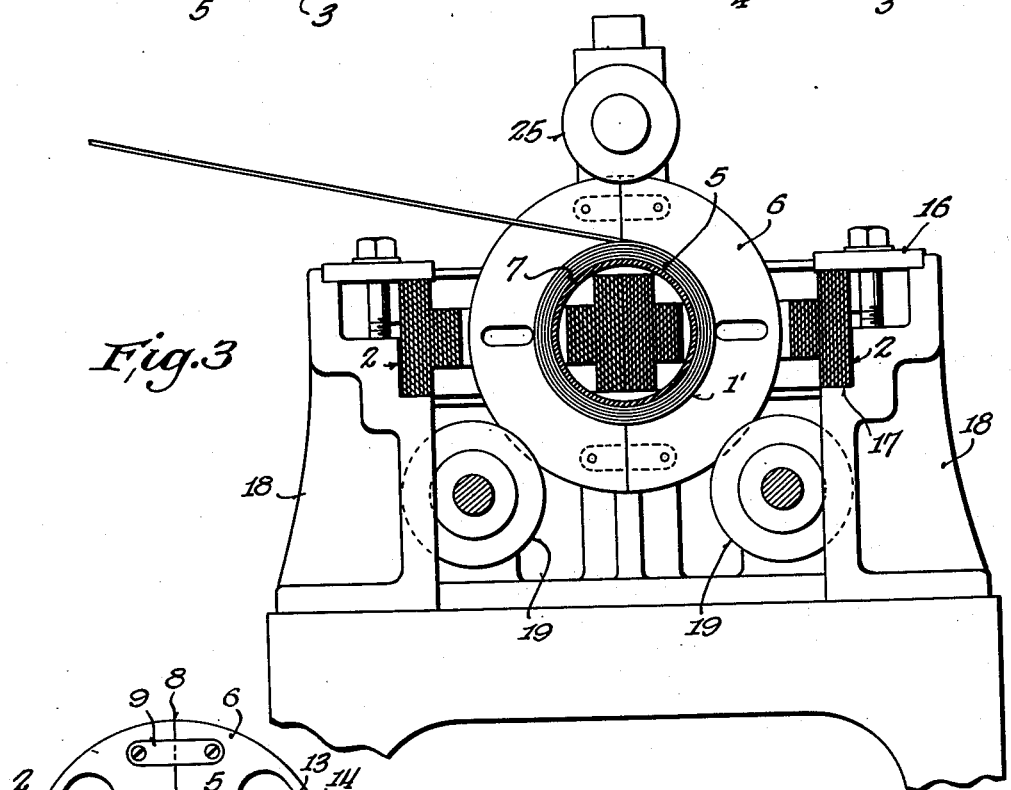
Figure 3 is a vertical sectional view through the machine for winding the coils on the magnetic core, such view being partly in section.
Figure 4:
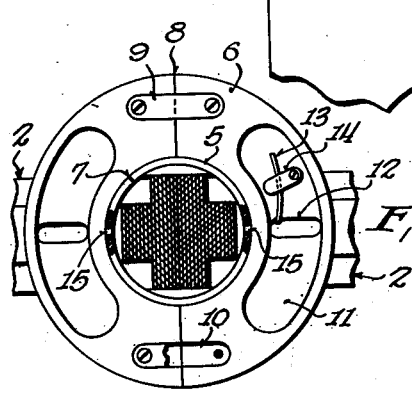
Figure 4 is a view partly in section showing an end view of the shell and one of the end flanges of the structure shown in Figure 3, the view showing the transformer core in section.

The insulating sleeve 5 is provided with apertures which receive pins 15 carried by the end sections as shown in Figure 4 so that rotation of the end flanges will rotate the sleeve 5. After the parts have been assembled as described, the outer sides of the cores 2 are clamped in the machine in any suitable manner, as by means of the clamping plates 16, see Figure 3, which hold the cores down against the shoulders 17 formed in the upright portions 18 of the machine.

Figure 5:
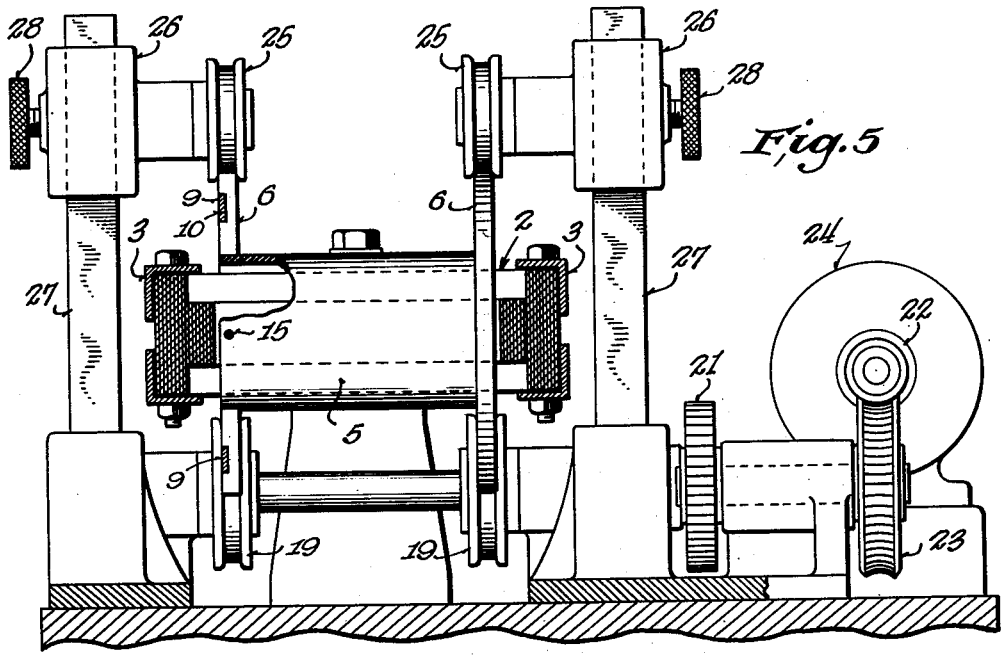
Figure 5 is a view at right angles to Figure 3 with parts sectioned off and with a part broken away.
Figure 6:
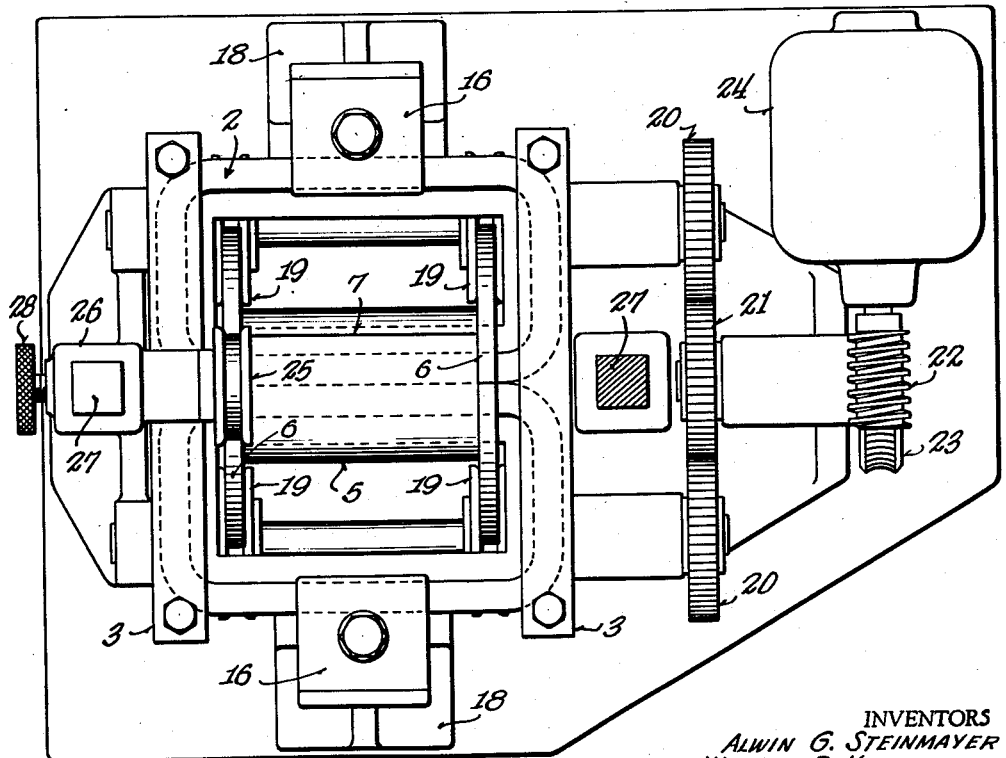
Figure 6 is a plan view with one of the standards in section.

A pair of grooved rollers 19 are provided for each end flange 6 and the end flanges fit within the grooves of these rollers, as shown most clearly in Figure 5. Each of these rollers may be a driving roller and may be driven in any suitable manner, as by means of the gears 20 on the shaft of the rollers 19 which mesh with a gear 21 driven through the worm and wormwheel mechanism 22 and 23 from an electric motor 24 or other suitable source of power, as shown in Figure 6. In this way each of the rollers 19 acts as a driving roller so that each end flange is driven at two spaced points and also is guided by these grooved rollers.

In order to hold the flanges down in contact with the rollers 19 and prevent inadvertent displacement, an upper grooved roller 25 is provided for each end flange, see Figures 3, 5 and 6.

These upper rollers 25 may be carried by suitable slides 26 locked to guides 27 by means of thumb screws 28 or in any other suitable manner. The construction is such that the upper rollers 25 may be removed during the positioning or removal of the transformer. It is obviously within the province of this invention to provide adjustable clamps which may be adjusted vertically or in and out and to provide further adjustment for different sizes of transformers, although the adjustability has not been shown other than for the upper rollers 25. In the particular form of the invention shown in Figures 3, 5 and 6, as well as that shown in Figures 13 and 14, the machine has been illustrated as constructed for winding one size of transformer, although as stated the invention is applicable to a machine in which adjustment is provided for accommodating transformers of different sizes.

The construction is such, as shown in Figure 3, that the shell and end flanges are supported out of contact with the core and are revolubly carried and guided by the rollers 19 and 25. Also the shell and end flanges are prevented from shifting axially of the core by the grooved rollers.

In the practice of the invention, the wire from a suitable source is threaded through the opening 12, see Figure 4, and temporarily clamped in place as shown. Thereafter the motor 24 is started and the rollers 19 are power driven to thereby drive the end flanges 6 and consequently rotate the shell. The wire is guided onto the shell by hand or in any other suitable manner and the coil structure is wound.

The openings in the end flanges are not absolutely necessary for it is possible to wind the coils without having the end flanges apertured. This is apparent when it is considered that the coils are wound on insulating sheets and are spaced from the ends of the sheets to leave a free space. The end wires or the wires from tapped points may be wound in this space. During winding of the coil, a tie cord is wrapped in the rest of the winding and when the layer is completed, all of the wires except the wires in the end space are tied in place by means of these tie cords. This arrangement makes it possible too pull out these end turns after the flanges are removed, to thereby provide terminal leads of any desired length.

The above arrangement is shown in Figure 19 in which the shell is indicated at 5' and the removable flange at 6'. The free turns of the winding are indicated by the reference character 13'. The remaining turns are tied by means of tie cords indicated at T. Each layer has a tie cord which extends the full length of the winding and is tied in place when the winding is completed before the next layer of insulating sheet indicated at S is positioned.

Obviously, if a transformer coil structure is to be wound, the primary and secondary are usually wound one upon the other or side by side in accordance with the usual practice. If a choke construction is desired, a single coil may be wound and constitutes the coil structure. In the description and claims, however, the term "coil" is intended to cover any coil structure whether a single coil or a plurality of coils are embodied in the coil structure.

The winding continues until the winding is completely formed. At intervals, for example at the ends of the successive layers, it is the usual practice to tie the wire against unwinding. This is readily accomplished as the entire face of the coil is freely exposed and accessible to the winder, as is obvious from Figures 5 and 6. Also it is apparent that the wire may be freely guided back and forth to form successive layers as there is nothing to obstruct this operation.

After the coil is wound, the end flanges are removed and thereafter the coil is taped or otherwise finished in accordance with the usual practice. In the form of the invention thus far described, the insulating shell is left in place as a permanent part of the coil structure, though this is not necessary as it is possible to remove the shell by forming it of a plurality of sections, as will hereinafter appear.

In the form of the invention shown in Figure 7, a multiple section shell has been illustrated. This shell may comprise four sections 29 which are divided as indicated at 30 and which are spaced apart at approximately 90° therefrom as indicated at 31. This spacing is secured by having the pins 32 carried by the half sections 33 of the end flanges fit into apertures at the division line 31, to thus hold the sections of the shell slightly spaced apart at diametrically opposite points.

If the form of core shown in Figure 11 is employed, it is obvious that the shell need not be formed of more than two sections of the flanges 29' which are slightly spaced apart at 31' at diametrically opposite points by means of the pins 32 carried by the end flanges 33.

Any suitable type of clips may be employed for holding the half sections together. For example, clips 34 seated in depressions as previously described may be employed and these clips may be secured by screws or in any other suitable manner to the half sections of the end flanges. The end flanges may be constructed as previously described.

It is obvious that after the coil has been wound, that the end flanges may be removed by removing the clips 34 and that after this is done, the sections of the shell will collapse as the pins 32 are now removed and the spaces furnished at the divisions 31 are available to allow the half sections of Figure 11 or the quarter sections of Figure 7 of the shell to approach each other. Thus it is possible to remove the sections of the shell. Thereafter the coil may be finished in any suitable manner.

In the form of the invention as shown in Figures 7 and 11 where the shell is removable, it is obviously possible to use steel or other metal shell sections as these are removed and form no portion of the completed transformer.

As previously described, the shell is preferably held out of contact with the core during winding. In all forms of the invention as will appear hereinafter, it is preferable to drive wedges into certain of the spaces between the coil structure and the core, as will be shown hereinafter, so as to prevent the coil from shifting or vibrating with reference to the core.

It is obvious that the core may take any form desired. For instance, the cruciform shape has been shown. It is clear however that rectangular, round or other shaped cores could be employed.

The cores are closed cores and may be formed in the manner described in our copending application Serial No. 339,256, filed June 7, 1940, for Method and means for making cores for transformers or the like.

The shell and end flanges may take other forms. For instance as shown in Figures 8 and 9, the shell is formed of two half sections 35 and 36 each of which is integral with the half sections of the end flanges 37 and 38 respectively. If desired, the adjacent portions of the shell may overlap, as indicated at 39, and also the half sections 38 of the end flanges may be provided with lips or tongues 40 which are seated in correspondingly recessed portions of the half sections 37 of the end flanges. Screws or other suitable fastening means 41 may be provided to secure the lips 40 to the sections 37.

In this construction the shell and end flanges are formed of any suitable insulating material, such as wood, "Bakelite," fiber, or of any other appropriate insulating material. The shell and the end flanges are left in place in the completed coil structure and form a permanent part of the coil structure.

In place of having the tongues 40 and the screws 41 as described in connection with Figures 8 and 9, the half sections of the end flanges indicated at 42 and 43 in Figure 10 may be provided with registering arcuate slots 44 within which an arcuate key piece 45 is firmly seated. For example, the key pieces may have a pressed fit in the recesses 44.

Figure 13:
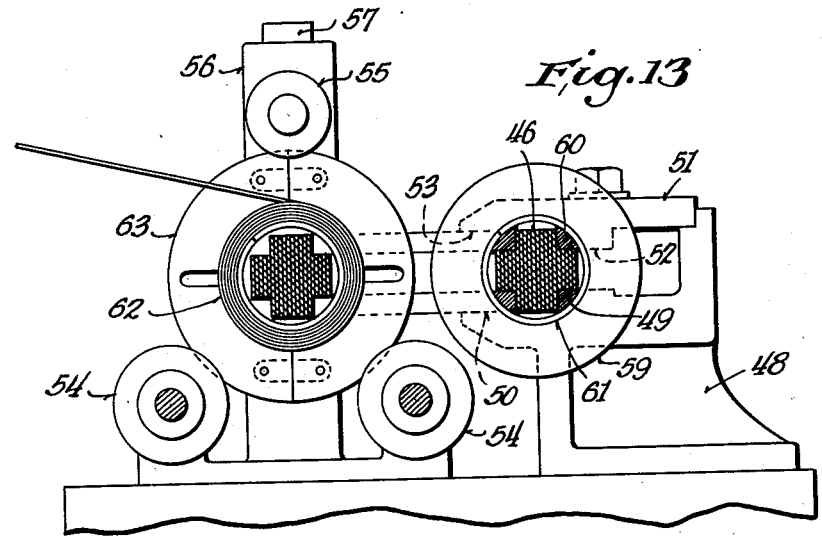
Figure 13 is a view of a further form that the machine may take, such view being partly in section and showing one coil structure complete and the other coil structure partly wound with an end flange removed.
Figure 14:
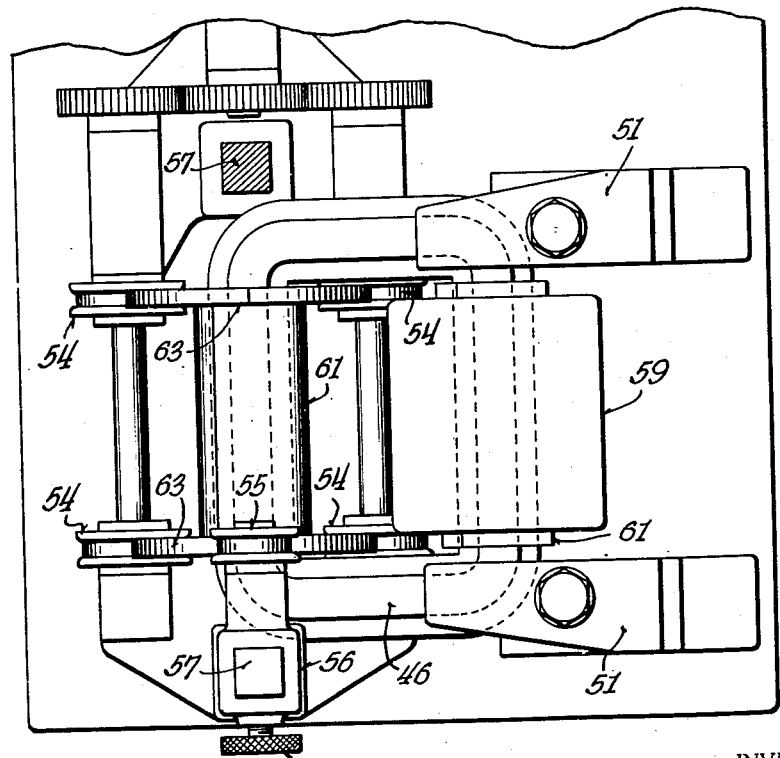
Figure 14 is a plan view of the structure shown in Figure 13, such view showing one of the standards in section.

It is clear that the invention is not limited to either the method or machine for winding a transformer or choke of the type shown in Figure 1, but may be used to wind a transformer or choke of other types, for example as shown in Figure 12. In this form of the invention the core is indicated by the reference character 46 and is provided with coil structures 47 on opposite legs thereof. A slightly different type of machine is employed for winding this type of transformer. The machine is shown in Figures 13 and 14 and is in essence substantially the same as that previously described. However, the clamping means may consist of an upright portion 48 which is provided with shouldered portions 49 and 50 to grip the narrower and larger portions of the transformer core 46.

A correspondingly shaped clamping bracket or plate 51 is provided for clamping against the upper face of the core. This clamping bracket or plate may have the portions 52 and 53. It is preferable to extend the portions 50 and 53 outwardly so as to provide adequate support as the outer end of the core, that is to say, the left-hand side as viewed in Figure 13, is held projected outwardly from the support.

Grooved driving rollers 54 are provided and an upper grooved roller 55 is also provided for engaging the lower and upper portions of the end flanges respectively. The upper rollers 55 are carried by removable slides 56 suitably locked to guides 57 by means of thumb screws 58, see Figure 14.

In Figures 13 and 14 one coil structure has been shown as completed and is indicated by the reference character 59. Suitable wooden or other blocks 60 are driven in between the shell 61, if a shell is employed, and the core structure or else between the finished coil and the core structure, in the event a shell is not employed.

On the left-hand portion of Figure 13 a partially wound coil has been shown and is indicated by the reference character 62. The end flanges are shown at 63 and the shell and end flanges may take any form desired, a few of the forms having been previously described.

In this form of the invention, the shell is preferably held out of contact with the core while the coil is being wound, as indicated in Figure 13, and is power driven as previously described. The winding progresses freely from side to side to form the successive layers and the entire face of the coil is exposed and provides free access for the winder, so that he may tie the appropriate portions of the coil as it is being formed, if so desired. Also this open space allows the free feeding of the wire back and forth to form successive layers of the coil and provides for the easy insertion of insulating sheets between successive layers in accordance with the usual practice.

In Figure 15 a diagrammatic view of a further form of machine has been shown in which the means for driving the shell on which the coil is wound may be provided with chains or belts. In the form shown belts 64 are employed and the end flanges 65 of the shell 66 are grooved for the reception of the belts 64. It is to be understood, however, that flat belts may be employed and the end flanges 65 may not be provided with grooves, in which event the flat belts would have a face to face engagement with the peripheral portions of the end flanges, as will be described in connection with Figure 18. It is also obvious that the belts 64 could be V belts or round belts, or could have any other shape desired.

Supporting rollers or pulleys 67 are positioned adjacent the lower portions of the flanges 65 and support such flanges, the belts passing between the pulleys or rollers 67. If desired, the rollers 67 may be flanged and the flanges of the rollers 67 may overlap the flanges 65 as shown in Figure 15. The rollers 67 may be provided with two flanges, one on each side of the corresponding flange 65 of the shell 66, or the rollers may be provided with a single flange located either inside or outside of the corresponding flange 65 of the shell 66. This provides means whereby axial shifting of the coil during winding is prevented. The belts 64 pass around the lower pulleys 68.

The core 69 is held clamped in any suitable manner not shown and the shell 66 is rotated during winding of the coil. If desired, either or both of the sets of rollers or pulleys 67 may be driving rollers or, if desired, the drive may be entirely through the belts, in which case the pulleys 68 would be the driving pulleys.

The belts 64 are preferably provided with a detachable section which may consist of the conventional looped portions 70 extending from opposite sections of the belts and which are interfitted. A rawhide or other plug 71 is run through the loops to thus detachably join the two sections of the belts. This construction enables the sections of the belts to be detached and allows the belts to be threaded through the window of the core 69 of the transformer, after which the sections of the belts are joined as previously described.

It is also possible to hold the core 69 in the position shown in Figure 17, in which event the belts 64 do not have to be opened up as they may be slipped over both the core and the shell on which the coil is being wound as the belts enclose both the shell and the core.

It is to be observed that in the construction shown in Figures 15 and 17 the belt holds the flanges of the shell down in place and thereby eliminates the necessity of having any upper overhanging portion of the machine, as in the form previously described. Although free access to the coil during winding is provided by the previously described structure, nevertheless the belt provides an even greater freedom of access to the coil during winding.

In the form shown in Figure 18, the member 72 may be either a belt or a chain and is preferably made in a manner similar to that shown in Figure 16 so that it may be opened up. In this form of the invention the end flanges 65' of the shell 66 rest upon the rollers 73 which are preferably flanged as previously described to prevent axial shifting of the shell 66. It is to be understood, of course, that this construction is duplicated for each of the flanges 65 of the shell 66. The flanges 65' may be either grooved as previously described or ungrooved as shown in Figure 18.

Either or both of the rollers 73 may be driving rollers and the belts 72 may be depended upon merely to hold the flanges 65' in contact with the rollers 73. The belts 72 extend over pairs of lower rollers 74. The rollers 74 may be grooved or flanged to maintain the belts in position or the rollers may be crowned. The belts 72 may be flat belts and may lie in flat face to face contact with the peripheral portions of the flanges 65', or the belts may be located within grooves formed in the flanges 65' as previously described.

It is also clear that the rollers 73 may be merely guiding and supporting rollers and that either or both of the pairs of rollers 74 may be driving rollers. Similarly to the construction shown in Figures 15 and 17, the construction shown in Figure 18 leaves the upper portion of the coil unobstructed.

It is clear that the core 69 could be held in any suitable manner either in the position shown in full lines in Figure 18, in which event the belt would have to be capable of being opened up so that it could be threaded through the window in the core, or the core could be held as shown in dotted lines in Figure 18, in which event the belts need not be capable of being separated as the core would be positioned within the outline of the belts.

It is to be understood that the term belt is intended to cover either a chain or a belt proper, or any other suitable flexible member.

It will be seen further that in practicing this invention a circular coil is produced. This is possible because of the fact that a preformed wound, straight-sided core is provided on which the circular coil may be wound. The circular coil has much greater mechanical strength than a preformed rectangular coil. Thus all of the advantages inherent in the use of a circular coil are obtained. Further than this, by having the core preformed, the core itself is given the rectangular shape and the coil is given the circular shape, the core after being wound in a rectangular shape being annealed and thereafter not being reworked at all, this invention providing means for winding the coil on the shaped annealed core without requiring any bending or reworking of the core whatsoever. The result of this is that the successive layers of the core remain in their highly compacted condition as described in greater detail in our copending application Serial No. 339,256, filed June 7, 1940, for Method and means for making cores for transformers or the like, as there is no reworking of the core whatsoever.

Additionally it is possible, where a rectangular shaped core is employed and a circular coil wound thereon, to wind the coil so that it has a relatively small depth as compared with its axial length, thus materially reducing the reactance of the completed transformer. It is obvious that if a circular core were employed and a preformed winding were used and the preformed circular core were threaded through and rewound so as to interloop with the preformed rectangular conducting coil, that a conducting coil of relatively great depth as compared with its axial length would result with consequent increase in the reactance of the finished transformer.

This invention as described hereinabove avoids the necessity of forming the conducting winding or coil having relatively great depth as compared with its length and yet the conducting coil may substantially fill the window through the core.

It will be seen that a novel method of winding coils and novel machines for winding coils on closed cores or on other cores on which a finished coil cannot be slipped have been provided by this invention. This invention contemplates, as is apparent from the preceding description and from the disclosure of the drawings, the winding of the coil in place on the core by causing relative rotation of the coil and core. In the particular from shown, the coil has been rotated and the core held stationary.

It will be seen further that this invention provides a very simple method of winding a coil in place on a magnetic core and thus many steps in the assembly of transformers or chokes are avoided and the construction of the transformer, choke or other electromagnetic device has therefore been materially simplified and the number of steps in its manufacture materially reduced by this invention.

Although this invention has been described in considerable detail, it is to be understood that such description is intended as illustrative rather than limiting, as the invention may be variously embodied and is to be interpreted as claimed.

We claim:

1. The method of forming a coil on a closed magnetic core wound to closed form from elongated magnetic material comprising placing a multi-section cylindrical shell around a part of the core with certain of the sections slightly spaced apart, winding a coil on the rotating shell by causing relative rotation of the shell and core, and reducing the diameter of the shell and removing the shell by removing successive sections thereof.

2. The method of forming a coil on a closed magnetic core wound to closed form from elongated magnetic material comprising placing a shell with end flanges around a part of the core, guiding the end flanges to hold the shell out of contact with the core and rotating the end flanges to thereby rotate the shell, and winding a coil on the rotating shell.

3. The method of forming a coil on a closed magnetic core wound to closed form from elongated magnetic material comprising placing a shell with end flanges around a part of the core, rotating the end flanges to thereby rotate the shell, winding a coil on the rotating shell, and removing the end flanges and leaving the shell in place as a permanent part of the coil structure.

4. The method of forming a coil on a closed magnetic core comprising springing a resilient split shell around a part of the core, rotating the shell, and winding a coil on the rotating shell, the shell constituting a permanent part of the assembly.

5. The method of forming a coil on a closed magnetic core comprising placing a shell around a part of the core, securing split flanges to opposite ends of the shell, rotating the flanges to thereby rotate the shell, winding a coil on the rotating shell, and removing the flanges after the coil has been wound.

6. The method of forming a coil on a closed magnetic core comprising placing a shell and end flanges around a part of the core, supporting the core, revolubly supporting the flanges and guiding the flanges independently of the core to prevent axial shifting of the shell with reference to the core, rotating the flanges to thereby rotate the shell, and winding a coil on the rotating shell.

7. The method of forming a coil on a closed magnetic core comprising placing a shell around a part of the core, securing split flanges to opposite ends of the shell, revolubly supporting the flanges to support the shell out of contact with the core, rotating the flanges to thereby rotate the shell, winding a coil on the rotating shell, and removing the flanges after the coil has been wound.

8. The method of forming a coil on a closed magnetic core comprising placing a shell with end flanges around a part of the core, rotating the end flanges to thereby rotate the shell, winding a coil on the rotating shell, and removing the end flanges and collapsing and removing the shell and leaving the wound coil in place.

9. The method of forming a coil on a closed core comprising placing a shell with end flanges having recesses therein around a part of the core, locating at least one lead of the coil in a recess of the flanges, rotating the flanges to thereby rotate the shell, and winding a coil on the rotating shell while at least one lead of the coil is located in a recess in the end flanges.

10. A machine for winding a conducting coil on a flanged shell surrounding a magnetic core for a transformer or the like, said machine comprising means for holding a core stationary, and a plurality of rollers for engaging the flanges of the shell, at least one of said rollers being power driven to rotate the shell through the medium of at least one of the flanges without engagement between the power driven roller and the conducting coil.

11. A machine for winding a coil on a flanged shell surrounding a magnetic core for a transformer or the like, said machine comprising means for holding a core stationary and a plurality of rollers for engaging the flanges of the shell, said rollers being arranged in pairs and being located on opposite sides of the core with one pair of rollers located above the core, said machine being open between the last mentioned pair of rollers to provide free access to the coil while it is being wound on the shell, at least one pair of said rollers being power driven to rotate the shell through the medium of the flanges.

12. A machine for winding a coil on a flanged shell surrounding a magnetic core for a transformer or the like, said machine comprising means for holding a core stationary and a plurality of grooved rollers for engaging the flanges of the shell, the flanges being received within the grooves of said rollers whereby axial shifting of the shell is prevented, at least one of said rollers being power driven to rotate the shell.

13. A machine for winding a coil on a flanged shell surrounding a magnetic core for a transformer or the like, said machine comprising means for holding a core stationary and a plurality of rollers for revolubly supporting the flanges of the shell, belts passing over the flanges of the shell, and a roller located below said shell around which said belts pass to thereby hold the shell downward with its flanges supported from said first mentioned rollers, said machine including means for rotating said shell.

14. The method of winding a coil structure upon a core comprising placing a shell and end flanges around the core to provide a spool like structure, winding a coil on said shell in successive layers, leaving a few end turns of the coil loose and tying convolutions of the coil adjacent the loose end turns to the body of the coil, winding the coil back and forth in layers and placing insulating sheets between layers with the layers of the winding spaced from the ends of the sheets to provide unused end spaces between successive sheets, tying the convolutions of the coil, winding a few loose turns in one of said unused spaces, removing at least the end flanges, and pulling out the said loose turns to provide terminal leads of any desired length.

15. The method of winding a coil structure upon a core comprising winding the coil in successive layers by bodily rotating the coil about the core while it is being wound, placing insulating sheets between layers of the winding with the winding spaced from the ends of the sheets, leaving a few end turns of the coil in a layer loose and coiled in a continuation of the layer and housed between successive insulating sheets to temporarily protect the loose turns during the rotation of the coil, tying the remaining convolutions of the coil in the layer adjacent the loose end turns together and pulling out said loose end turns to provide terminal leads of any desired length.

ALWIN G. STEINMAYER.
WILLIAM E. KRUEGER.